United States Patent [19]

Nakamura

[11] Patent Number: 4,931,652
[45] Date of Patent: Jun. 5, 1990

[54] RADIATION IMAGE RECORDING AND REPRODUCING METHOD

[75] Inventor: Takashi Nakamura, Kaisei, Japan

[73] Assignee: Fuji Photo Film Co., Ltd., Minami-ashigara, Japan

[21] Appl. No.: 695,592

[22] Filed: Jan. 28, 1985

[30] Foreign Application Priority Data

Jan. 27, 1984 [JP] Japan .................................. 59-13154

[51] Int. Cl.$^5$ ..................... G01T 1/202; C09K 11/477
[52] U.S. Cl. ............................. 250/484.1; 252/301.6 P
[58] Field of Search .......................... 250/484.1, 327.2; 252/301.6 P

[56] References Cited

U.S. PATENT DOCUMENTS 4,261,854  4/1981  Kotera et al. ..................... 250/327.2
4,353,808  10/1982  Tanimizu et al. ............ 252/301.6 P

OTHER PUBLICATIONS

An Introduction to Luminescence of Solids by H. Leverenz (Dover Pub.), 1968, Appendix I.
"X-Ray Storage Prop. of IR Storage Phosphor . . . " Berg et al., Apr. 1947, pp. 343–347.

Primary Examiner—Janice A. Howell
Assistant Examiner—Richard Hanig
Attorney, Agent, or Firm—Sixbey, Friedman, Leedom & Ferguson

[57] ABSTRACT

A radiation image recording and reproducing method comprising steps of: (i) causing a divalent europium activated alkaline earth metal halophosphate phosphor having the formula (I):

$$M^{II}{}_2OP_4X{:}xEu^{2+} \qquad (I)$$

in which $M^{II}$ is at least one alkaline earth metal selected from the group consisting of Ca, Sr and Ba; X is at least one halogen selected from the group consisting of Cl, Br and I; and x is a number satisfying the condition of $0 < x \leq 0.2$, to absorb a radiation having passed through an object or having radiated from an object; (ii) exciting said phosphor with an electromagnetic wave having a wavelength within the range of 500–800 nm to release the radiation energy stored therein as light emission; and (iii) detecting the emitted light.

9 Claims, 3 Drawing Sheets

RADIATION IMAGE RECORDING AND REPRODUCING METHOD

BACKGROUND OF THE INVENTION

1. Field of the Invention

The present invention relates to a radiation image recording and reproducing method, and more particularly, to a radiation image recording and reproducing method employing a divalent europium activated alkaline earth metal halophosphate phosphor.

2. Description of the Prior Art

For obtaining a radiation image, there has been conventionally utilized radiography employing a combination of a radiographic film having an emulsion layer containing a photosensitive silver salt material and an intensifying screen. As a method replacing the above-mentioned conventional radiography, a radiation image recording and reproducing method employing a stimulable phosphor stated, for instance, in U.S. Pat. No. 4,239,968, has been recently paid much attention. The radiation image recording and reproducing method involves steps of causing the stimulable phosphor to absorb a radiation having passed through an object or having radiated from an object; exciting the phosphor with an electromagnetic wave such as visible light or infrared rays (stimulating rays) to release the radiation energy stored in the phosphor as light emission (stimulated emission); photoelectrically detecting the emitted light to obtain electric signals; and reproducing the radiation image of the object as a visible image from the electric signals.

In the radiation image recording and reproducing method, a radiation image is obtainable with a sufficient amount of information by applying a radiation to the object at a considerably smaller dose as compared with the conventional radiography. Accordingly, the radiation image recording and reproducing method is of great value, especially when the method is used for medical diagnosis.

The phosphor employable in the above-described method is a stimulable phosphor which emits light (gives a stimulated emission) when excited with an electromagnetic wave in the visible to infrared region after having exposed to a radiation such as X-rays. For such stimulable phosphor, there have been known a divalent europium activated alkaline earth metal fluorohalide phosphor ($M^{II}FX:Eu^{2+}$, in which $M^{II}$ is at least one alkaline earth metal selected from the group consisting of Mg, Ca and Ba; and X is at least one halogen selected from the group consisting of Cl, Br and I); an europium and samarium activated strontium sulfide phosphor (SrS: Eu,Sm); an europium and samarium activated lanthanum oxysulfide phosphor ($La_2O_2S:Eu,Sm$); an europium activated barium aluminate phosphor ($BaO \cdot Al_2O_3:Eu$); an europium activated alkaline earth metal silicate phosphor ($M^{2+}O \cdot SiO_2:Eu$, in which $M^{2+}$ is at least one alkaline earth metal selected from the group consisting of Mg, Ca and Ba); a cerium activated rare earth oxyhalide phosphor (LnOX:Ce, in which Ln is at least one rare earth element selected from the group consisting of La, Y, Gd and Lu; and X is at least one halogen selected from the group consisting of Cl, Br and I), and the like.

SUMMARY OF THE INVENTION

A principal object of the present invention is to provide a radiation image recording and reproducing method employing a novel stimulable phosphor.

The present inventor has made a search for a stimulable phosphor, and found that a divalent europium activated alkaline earth metal halophosphate phosphor gives a stimulated emission.

The radiation image recording and reproducing method of the invention comprises steps of:

(i) causing a divalent europium activated alkaline earth metal halophosphate phosphor having the formula (I):

$$M^{II}_2PO_4X:xEu^{2+} \qquad (I)$$

in which $M^{II}$ is at least one alkaline earth metal selected from the group consisting of Ca, Sr and Ba; X is at least one halogen selected from the group consisting of Cl, Br and I; and x is a number satisfying the condition of $0 < x \leq 0.2$, to absorb a radiation having passed through an object or having radiated from an object;

(ii) exciting said phosphor with an electromagnetic wave having a wavelength within the range of 500–800 nm to release the radiation energy stored therein as light emission; and (iii) detecting the emitted light.

The divalent europium activated alkaline earth metal halophosphate phosphor having the formula (I) is known to emit light (give a spontaneous emission) in the visible region when excited with a radiation such as ultraviolet rays.

As a result of the study, the present inventor has newly found that the above phosphor emits light in the visible region upon excitation with an electromagnetic wave having a wavelength within the range of 500–800 nm after exposure to a radiation such as X-rays, that is, being a stimulable phosphor. Because of the characteristics that said phosphor gives a stimulated emission on the above conditions, the phosphor can be employed in the radiation image recording and reproducing method.

DETAILED DESCRIPTION OF THE INVENTION

The radiation image recording and reproducing method of the present invention will be described more in detail by way of an example of a radiation image storage panel containing the stimulable phosphor having the formula (I), referring to a schematic view shown in FIG. 1.

Figure 1:
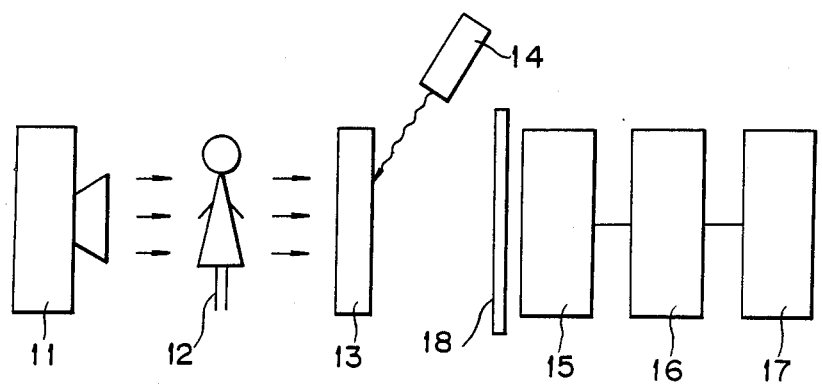
FIG. 1 is a schematic view showing the radiation image recording and reproducing method according to the present invention.

In FIG. 1 which shows the total system of the radiation image recording and reproducing method of the invention, a radiation generating device 11 such as an X-ray source provides a radiation for irradiating an object 12 therewith; a radiation image storage panel 13 containing the stimulable phosphor having the formula (I) absorbs and stores the radiation having passed through the object 12; a source of stimulating rays 14 provides an electromagnetic wave for releasing the radiation energy stored in the panel 13 as light emission; a photosensor 15 faces the panel 13 for detecting the light emitted by the panel 13 and converting it to electric signals; an image reproducing device 16 is connected with the photosensor 15 to reproduce a radiation image from the electric signals detected by the photosensor 15; a display device 17 is connected with the reproducing device 16 to display the reproduced image in the form of a visible image on a CRT or the like; and a filter 18 is disposed in front of the photosensor 15 to cut off the stimulating rays reflected by the panel 13 and allow only the light emitted by the panel 13 to pass through.

FIG. 1 illstrates an example of the system according to the method of the invention employed for obtaining a radiation-transmission image of an object. However, in the case that the object 12 itself emits a radiation, it is unnecessary to install the above-mentioned radiation generating device 11. Further, the devices 15 to 17 in the system can be replaced with other appropriate devices which can reproduce a radiation image having the information of the object 12 from the light emitted by the panel 13.

Referring to FIG. 1, when the object 12 is exposed to a radiation such as X-rays provided by the radiation generating device 11, the radiation passes through the object 12 in proportion to the radiation transmittance of each portion of the object. The radiation having passed through the object 12 impinges upon the radiation image storage panel 13, and is absorbed by the phosphor layer of the panel 13. Thus, a radiation energy-stored image (in the form of latent image) corresponding to the radiation-transmission image of the object 12 is formed on the panel 13.

Thereafter, when the radiation image storage panel 13 is irradiated with an electromagnetic wave having the wavelength within the range of 500-800 nm, which is provided by the source of stimulating rays 14, the radiation energy-stored image formed on the panel 13 is released as light emission. The intensity of so released light is in proportion to the amount of the radiation energy which has been absorbed by the phosphor layer of the panel 13. The light signals corresponding to the intensity of the emitted light are converted to electric signals by means of the photosensor 15, the electric signals are reproduced as an image in the image reproducing device 16, and the reproduced image is displayed on the display device 17.

The operation of reading out the image information stored in the radiation image storage panel is generally carried out by sequentially scanning the panel with a laser beam and detecting the emitted light under the scanning with a photosensor such as photomultiplier through a light guiding means to obtain electric signals. In order to obtain a well-readable visible image, the read-put operation may comprise a preliminary read-out operation and a final read-out operation, in which the panel is twice irradiated with stimulating rays though the energy of the stimulating rays in the former is lower than that in the latter (see: U.S. patent application No. 434,886). The read-out condition in the final read-out operation can be suitably set based on the result obtained by the preliminary read-out operation.

As the photosensor, solid-state photoelectric conversion devices such as a photoconductor and a photodiode can be also used (see: U.S. patent application No. 610,582, Japanese Patent Applications No. 58(1983)-219313 and No. 58(1983)-219314, and Japanese Patent Provisional Publication No. 58(1983)-121874). For example, the photosensor is divided into a great number of pixels, which may be combined with a radiation image storage panel or positioned in the vicinity of the panel. Otherwise, the photosensor may be a linesensor in which plural pixels are linearly arranged or may be such one that corresponds to one pixel.

In the above-mentioned cases, there may be employed as the source of stimulating rays a linear light source such as an array in which light emitting diodes (LED), semiconductor lasers or the like are linearly arranged, in addition to a point light source such as a laser. The read-out using such photosensor can prevent loss of the light emitted by a panel and can bring about the enhancement of S/N ratio of the image, because the photosensor can receive the emitted light with a large angle. It is also possible to enhance the read-out speed, because electric signals are sequentially obtained not by scanning the panel with stimulating rays but by electrical processing of the photosensor.

After reading out the image information stored in a radiation image storage panel, the panel is preferably subjected to a procedure of erasing the radiation energy remaining therein, that is, to the exposure to light having a wavelength in the wavelength region of stimulating rays for the phosphor contained therein or to heating (see: U.S. Pat. No. 4,400,619 and Japanese Patent Provisional Publication No. 56(1981)-12599). The erasing procedure can prevent the occurring of noise originating from the after image in the next use of the panel. Further, the panel can be more effectively prevented from the occurrence of noise attributable to natural radiations by carrying out the erasing procedure twice, namely after the read-out and just before the next use (see: U.S. patent application No. 338,734).

In the radiation image recording and reproducing method of the present invention, there is no specific limitation on the radiation employable for exposure of an object to obtain a radiation-transmission image thereof, as far as the above-described phosphor gives a stimulated emission upon excitation with the electromagnetic wave after exposure to the radiation. Examples of the radiation employable in the invention include those generally known, such as X-rays, cathode rays and ultraviolet rays. Likewise, there is no specific limitation on the radiation radiating from an object for obtaining a radiation image thereof, as far as the radiation can be absorbed by the above-described phosphor to serve as an energy source for producing the stimulated emission. Examples of the radiation include $\gamma$-rays, $\alpha$-rays and $\beta$-rays.

As the source of stimulating rays for exciting the phosphor which has absorbed the radiation having passed through or radiated from the object, there can be employed, for instance, light sources providing light having a band spectrum distribution in the wavelength region of 500-800 nm; and light sources providing light having a single wavelength or more in said region such as an Ar ion laser, a Kr ion laser, a He-Ne laser, a ruby laser, a semiconductor laser, a glass laser, a YAG laser, a dye laser and a LED. Among the above-mentioned sources of stimulating rays, the lasers are preferred because the radiation image storage panel is exposed thereto with a high energy density per unit area. Particularly preferred are the Ar ion laser, Kr ion laser and He-Ne laser. The semiconductor laser is also preferred, because its size is small, it can be driven by a weak electric power, and its output power can be easily stabilized owing to the direct modulation thereof.

As the light source for erasing the radiation energy remaining in the radiation image storage panel, a light source at least providing light of a wavelength within the wavelength region of stimulating rays for the above-mentioned phosphor is employed. Examples of the light source employable in the method of the present invention include a fluorescent lamp, a tungsten lamp and a halogen lamp as well as the above-mentioned sources of stimulating rays.

The recording and read-out of a radiation image in the method of the invention can be carried out by using a built-in type radiation image conversion apparatus which comprises a recording section for recording the radiation image on the radiation image storage panel (i.e., causing a stimulable phosphor of the panel to absorb and store radiation energy), a read-out section for reading out the radiation image recorded on the panel (i.e, exciting the phosphor with stimulating rays to release the radiation energy as light emission), and an erasing section for eliminating the radiation image remained in the panel (i.e., causing the phosphor to release the remaining energy) (see: U.S. patent applications No. 434,883 and No. 600,689). By employing such built-in type apparatus, the radiation image storage panel (or a recording medium containing a stimulable phosphor) can be circularly and repeatedly used and a number of images having a quality at a certain level are stably obtainable. The radiation image conversion apparatus can be made so compact and light-weight as to easily set and move the apparatus. It is further possible to move the apparatus place to place to record the radiation images for mass examinations by loading a traveling X-ray diagnosis station in the form of a vehicle with the apparatus.

The stimulable phosphor having the following formula (I), which is employed in the radiation image recording and reproducing method of the present invention will be described below:

$$M^{II}{}_2PO_4X:xEu^{2+} \qquad (I)$$

in which $M^{II}$ is at least one alkaline earth metal selected from the group consisting of Ca, Sr and Ba; X is at least one halogen selected from the group consisting of Cl, Br and I; and x is a number satisfying the condition of $0 < x \leq 0.2$.

The divalent europium activated alkaline earth metal halophosphate phosphor having the above formula (I) can be prepared, for instance, by the process described below.

As starting materials, the following materials can be employed:

(1) alkaline earth metal hydrogenphosphate;
(2) alkaline earth metal halide; and
(3) europium compound such as europium halide, europium oxide, europium nitrate or europium sulfate.

The above-mentioned starting materials (1) to (3) are, in the first place, mixed in the stoichiometric ratio corresponding to the formula (II):

$$M^{II}{}_2PO_4X:xEu \qquad (II)$$

in which $M^{II}$, X and x are the same meanings as defined above.

Then, the mixture of the starting materials is fired at a temperature of 500°–1300° C. for 0.5–6 hours in a weak reducing atmosphere such as a nitrogen gas atmosphere containing a small amount of hydrogen gas or a carbon dioxide gas atmosphere containing carbon monoxide gas. In the case of employing a trivalent europium compound as the starting material (3), the trivalent europium contained in the mixture is reduced into divalent europium in the firing stage.

Through the firing procedure, a powdery phosphor is produced. The powdery phosphor thus obtained may be processed in a conventional manner involving a variety of procedures for the preparation of phosphors such as a washing procedure, a drying procedure and a sieving procedure.

Figure 2:
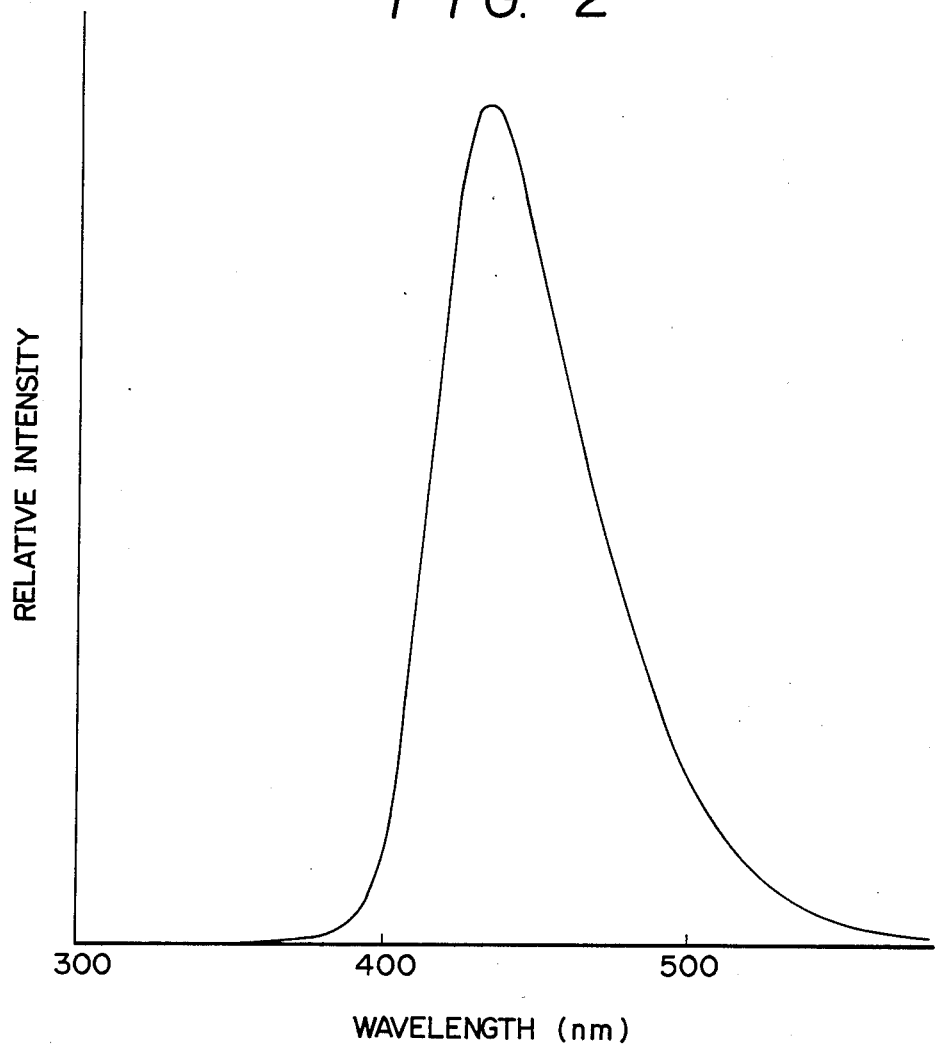
FIGS. 2 shows a stimulated emission spectrum of a divalent europium activated barium phosphate chloride phosphor [$Ba_2PO_4Cl:0.002Eu^{2+}$] employed in the invention.
Figure 3:
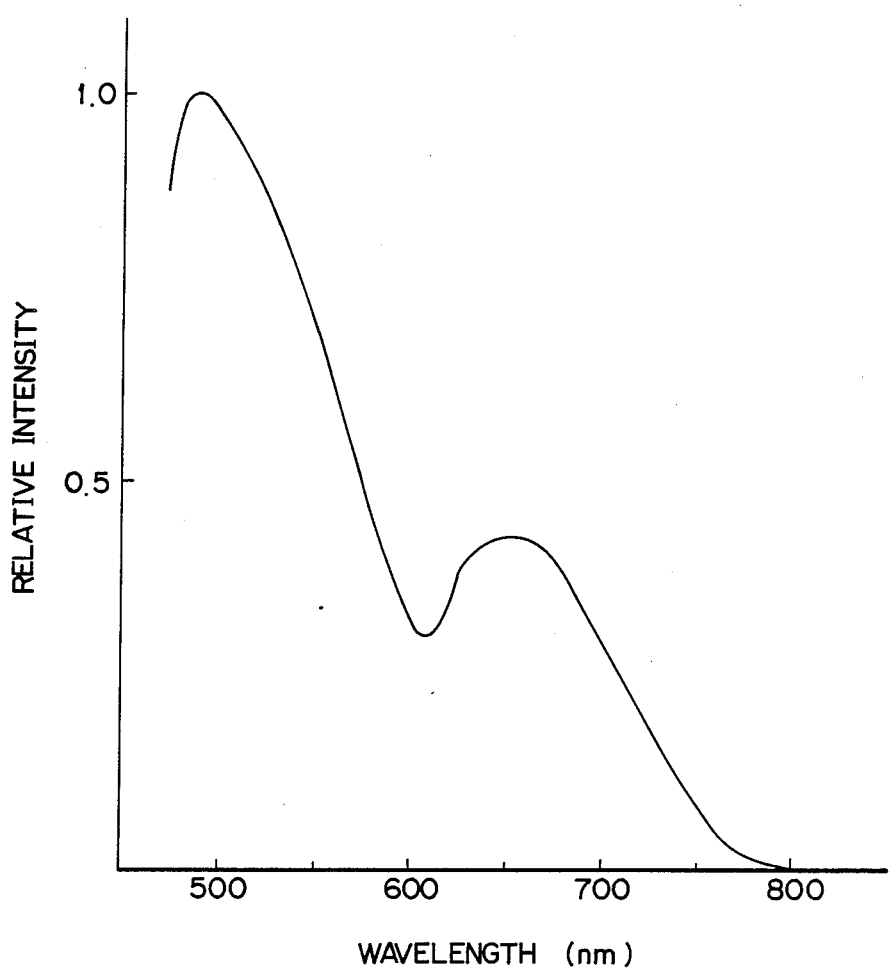
FIGS. 3 shows a stimulation spectrum of the divalent europium activated barium phosphate chloride phosphor [$Ba_2PO_4Cl:0.002Eu^{2+}$] employed in the invention.

The divalent europium activated alkaline earth metal halophosphate phosphor having the formula (I) gives a stimulated emission upon excitation with an electromagnetic wave having a wavelength within the region of 500–800 nm after exposure to a radiation such as X-rays and its peak wavelength is approximately 430 nm, as shown in FIGS. 2 and 3.

FIGS. 2 shows a stimulated emission spectrum of a divalent europium activated barium phosphate chloride phosphor [$Ba_2PO_4Cl:0.002Eu^{2+}$] which is an example of the phosphor having the formula (I), given upon excitation with an Ar ion laser beam (514.5 nm) after exposure to X-rays of 80 KVp.

FIGS. 3 shows a stimulation spectrum of the divalent europium activated barium phosphate chloride phosphor, which is measured at the peak wavelength of the emission upon excitation with stimulating rays whose wavelength is varied in the range of 450–800 nm after exposure to X-rays of 80 KVp.

It has been confirmed that the phosphors other than the above-mentioned divalent europium activated barium phosphate chloride phosphor, which are employed in the present invention, show almost the same stimulated emission spectra and stimulation spectra as those of the above-mentioned phosphor.

From the viewpoint of the luminance of stimulated emission of the divalent europium activated alkaline earth metal halophosphate phosphor having the formula (I), $M^{II}$ in the formula (I) is preferably Ba, X is preferably Cl, and the number for x is preferably within the range of $10^{-5} \leq x \leq 10^{-2}$.

The above-described divalent europium activated alkaline earth metal halophosphate phosphor is generally employed in the form of a radiation image storage panel in the radiation image recording and reproducing method of the present invention. The radiation image storage panel substantially comprises a support and a phosphor layer provided thereon, which comprises a binder and a stimulable phosphor dispersed therein.

The radiation image storage panel having such structure can be prepared, for instance, in the manner described below.

In the first place, the above-described stimulable phosphor particles and a binder are added to an appropriate solvent such as a lower alcohol, chlorinated hydrocarbon, ketone, ester or ether, and then they are mixed well to prepare a coating dispersion comprising the stimulable phosphor particles homogeneously dispersed in the binder solution.

Representative examples of the binder include proteins such as gelatin and synthetic polymers such as polyvinyl acetate, nitrocellulose, polyurethane, polyvinyl alcohol, linear polyester and polyalkyl (meth)acrylate.

The ratio between the binder and the stimulable phosphor in the coating dispersion is generally within the range of from 1:8 to 1:40 (binder:phosphor, by weight).

Then the coating dispersion is applied evenly to the surface of a support to form a layer of the coating dispersion. The layer of the coating dispersion is heated slowly to dryness so as to complete the formation of a phosphor layer. The thickness of the phosphor layer is generally within the range of 50–500 μm.

The support material can be selected from those employed for the radiographic intensifying screens in the conventional radiography and those employed in the known radiation image storage panels. Examples of the support material include plastic films such as films of cellulose acetate and polyethylene terephthalate, metal sheet such as aluminum foil, ordinary papers, baryta paper and resin-coated papers.

The surface of the support to receive the phosphor layer may be provided with additional layers such as an adhesive layer, a light-reflecting layer and light-absorbing layer. As described in U.S. patent application No. 496,278, the phosphor layer-side surface of the support (or the surface of the additional layers in the case that such layers are provided on the support) may be provided with protruded and depressed portions.

Further, a transparent protective film may be provided on the surface of the phosphor layer not facing the support to physically and chemically protect the phosphor layer. Examples of the material employable for the preparation of the transparent protective film include cellulose acetate, polymethyl methacrylate, polyethylene terephthalate and polyethylene. The transparent protective film generally has a thickness within the range of approx. 0.1–20 μm.

The radiation image storage panel containing the divalent europium activated alkaline earth metal halophosphate phosphor may be colored with an appropriate colorant as described in U.S. Pat. No. 4,394,581 and U.S. patent application No. 327,642. Further, white powder may be dispersed in the phosphor layer of the panel as described in U.S. Pat. No. 4,350,893.

The present invention will be illustrated by the following example, but this example by no means restricts the invention.

EXAMPLE

One mol. of barium hydrogenphosphate (BaHPO$_4$), 1.0 mol. of barium chloride (BaCl$_2$·2H$_2$O) and $1 \times 10^{-3}$ mol. of europium oxide (Eu$_2$O$_3$) were sufficiently pulverized and mixed to prepare a mixture of starting materials for a phosphor.

The mixture was fired at 950° C. for 2 hours under a nitrogen gas atmosphere containing a small amount of hydrogen gas. The fired product was allowed to stand for cooling and then pulverized to obtain a powdery divalent europium activated barium phosphate chloride phosphor [Ba$_2$PO$_4$Cl:0.002Eu$^{2+}$].

Thus prepared phosphor was measured on the stimulated emission spectrum and stimulation spectrum. The results are shown in FIGS. 2 and 3.

FIG. 2 shows a stimulated emission spectrum given when the phosphor is excited with an Ar ion laser beam (514.5 nm) after exposure to X-rays of 80 KVp.

FIG. 3 shows a stimulation spectrum at the wavelength of 430 nm given when the phosphor is excited with stimulating rays whose wavelength is varied after exposure to X-rays of 80 KVp.

I claim:

1. A radiation image recording and reproducing method comprising steps of:
   (i) causing a divalent europium activated alkaline earth metal halophosphate phosphor having the formula (I):

$$M^{II}{}_2PO_4X:xEu^{2+} \qquad (I)$$

in which $M^{II}$ is at least one alkaline earth metal selected from the group consisting of Ca, Sr and Ba; X is at least one halogen selected from the group consisting of Cl, Br and I; and x is a number satisfying the condition of $0 < x \leq 0.2$, to absorb a radiation having passed through an object or having radiated from an object;
   (ii) exciting said phosphor with an electromagnetic wave having a wavelength within the range of 500–800 nm to release the radiation energy stored therein as light emission; and
   (iii) detecting the emitted light.

2. The radiation image recording and reproducing method as claimed in claim 1, in which $M^{II}$ in the formula (I) is Ba.

3. The radiation image recording and reproducing method as claimed in claim 1, in which X in the formula (I) is Cl.

4. The radiation image recording and reproducing method as claimed in claim 1, in which x in the formula (I) is a number satisfying the condition of $10^{-5} \leq x \leq 10^{-2}$.

5. The radiation image recording and reproducing method as claimed in claim 1, in which said electromagnetic wave is a laser beam.

6. The radiation image recording and reproducing method as claimed in claim 5, in which said laser beam is an Ar ion laser beam.

7. The radiation image recording and reproducing method as claimed in claim 5, in which said laser beam is a Kr ion laser beam.

8. The radiation image recording and reproducing method as claimed in claim 5, in which said laser beam is a He-Ne laser beam.

9. The radiation image recording and reproducing method as claimed in any one of claims 1 through 8, in which said phosphor is employed in the form of a radiation image storage panel containing thereof which comprises a support and a phosphor layer provided thereon.

* * * * *